United States Patent
Brenner et al.

(10) Patent No.: US 11,556,427 B1
(45) Date of Patent: Jan. 17, 2023

(54) MULTI-BACKUP NETWORK INFORMED POLICY CREATION

(71) Applicant: Dell Products L.P., Round Rock, TX (US)

(72) Inventors: Adam Brenner, Mission Viejo, CA (US); Mark Malamut, Aliso Viejo, CA (US); Arun Murti, Mission Viejo, CA (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/507,000

(22) Filed: Oct. 21, 2021

Related U.S. Application Data

(63) Continuation-in-part of application No. 17/490,836, filed on Sep. 30, 2021.

(51) Int. Cl.
*G06F 11/14* (2006.01)
(52) U.S. Cl.
CPC .................. *G06F 11/1458* (2013.01)
(58) Field of Classification Search
CPC .................................................. G06F 11/1458
See application file for complete search history.

(56) References Cited

U.S. PATENT DOCUMENTS

| | | | | |
|---|---|---|---|---|
| 8,560,788 B1* | 10/2013 | Sreedharan | ......... | G06F 11/1461 711/161 |
| 2014/0052694 A1* | 2/2014 | Dasari | .................. | G06F 11/1461 707/654 |
| 2014/0081919 A1* | 3/2014 | Matsumoto | ......... | G06F 11/1469 707/E17.007 |
| 2015/0234703 A1* | 8/2015 | Udayashankar | .... | G06F 11/1004 707/646 |
| 2016/0342483 A1* | 11/2016 | Klingenberg | ....... | G06F 11/3006 |
| 2017/0034031 A1* | 2/2017 | Willis | ................... | H04L 43/045 |

* cited by examiner

*Primary Examiner* — Viet D Vu
(74) *Attorney, Agent, or Firm* — Staniford Tomita LLP

(57) ABSTRACT

Embodiments for optimizing multiple backup operations for a data protection system, by determining a size of a dataset to be saved in each backup operation and an available bandwidth in each transfer window of a plurality of transfer windows for transfer data between a source and destination; then determining an order of the backup operations based on first ordering the backups based on decreasing dataset size and second ordering the transfer windows in order of decreasing bandwidth, and matching the backups to the transfer windows in accordance with the first ordering and second ordering. The optimum time represents a time to initiate the backup operation that results in a shortest data transfer time over all of the transfer windows from as compared to other possible transfer windows in a defined backup period.

20 Claims, 11 Drawing Sheets

700

| Timestamp | Device | Bandwidth | | |
|---|---|---|---|---|
| | | Incoming (Mbps) | Outgoing (Mbps) | Uplink (Gbps) |
| Monday 12:00AM | Primary | 500 | 1000 | 10 |
| Monday 12:00AM | Secondary | 800 | 1 | 1 |
| Monday 12:20AM | Primary | 200 | 1,000 | 10 |
| Monday 12:20AM | Secondary | 20 | 500 | 1 |
| Monday 12:40AM | Primary | 2,000 | 4,000 | 10 |
| Monday 12:40AM | Secondary | 200 | 1 | 1 |
| Monday 1:00AM | Primary | 8,000 | 5,000 | 10 |
| Monday 1:00AM | Secondary | 200 | 800 | 1 |

| Timestamp | Result | Selected |
|---|---|---|
| Monday 12:00AM | 75GB (backup size) / 25MB/s = 50 minutes | No |
| Monday 12:20AM | 75GB (backup size) / 122.5MB/s = 10 minutes and 12 seconds | Yes |
| Monday 12:40AM | 75GB (backup size) / 100MB/s = 12 minutes and 30 seconds | No |
| Monday 1:00AM | 75GB (backup size) / 100MB/s = 12 minutes and 30 seconds | No |

| Backup | Transfer Window | Time Spent | |
|---|---|---|---|
| #1 | 12:00PM - 12:20PM | 6 minutes and 40 seconds | |
| #2 | 12:00PM - 12:20PM | 13 minutes and 20 seconds | Transferred 20GB, remaining 55GB |
| #2 | 12:20PM - 12:40PM | 8 minutes and 9 seconds | |
| #3 | 12:20PM - 12:40PM | 3 minutes and 32 seconds | |
| #4 | 12:20PM - 12:40PM | 2 minutes and 58 seconds | |
| #5 | 12:20PM - 12:40PM | 2 minutes and 13 seconds | |
| | Total | 36 minutes 52 seconds | |

| Backup | Transfer Window | Time spent |
|---|---|---|
| #2 | 12:20PM - 12:40PM | 11 minutes and 6 seconds |
| #3 | 12:20PM - 12:40PM | 3 minutes and 42 seconds |
| #4 | 12:20PM - 12:40PM | 2 minutes and 57 seconds |
| #5 | 12:20PM - 12:40PM | 2 minutes and 13 seconds |
| #1 | 12:40PM - 01:00PM | 2 minutes and 40 seconds |
| | Total Time | 22 minutes and 40 seconds |

FIG. 11B

MULTI-BACKUP NETWORK INFORMED POLICY CREATION

CROSS-REFERENCE TO RELATED APPLICATIONS

This application is a Continuation-In-Part application and claims priority to U.S. patent application Ser. No. 17/490,836, filed on Sep. 30, 2021 and entitled "Network Informed Policy Creation" and which is hereby incorporated by reference in its entirety.

TECHNICAL FIELD

This invention relates generally to data protection systems, and more specifically to using network device information and history data to optimize application of data protection policies.

BACKGROUND

Backup software is used by large organizations to store their data for recovery after system failures, routine maintenance, archiving, and so on. Backup sets are typically taken on a regular basis, such as hourly, daily, weekly, and so on, and can comprise vast amounts of information. Backup programs are often provided by vendors that provide backup infrastructure (software and/or hardware) to customers under service level agreements (SLA) that set out certain service level objectives (SLO) that dictate minimum standards for important operational criteria such as uptime and response time, etc. The various protection requirements and different network entities, i.e., data sources and storage devices, dictate the various data protection policies that are defined and used in a backup system.

Backing up data involves a series of stages. The first stage might be copying the data in a form of a snapshot of a virtual machine, file system, block device, database, and so on. Another stage is the movement of that copy to another location like secondary storage. Customer environments might have more stages afterwards, such as tiering the data to the cloud or replicating the data for disaster recovery. A present problem is that current backup software treats all stages as a single stage as opposed to separate stages. That is, the backup software applies a defined backup policy on all stages as one process. In addition, the different backup stages are dependent on multiple systems, such as primary and secondary storage as well as other activity within the network. It is assumed that both primary and secondary systems are not single-use systems but rather have multiple purposes, such as serving multiple workloads, virtual machines, file systems, and so on. It can become unpredictable for system administrators to determine the load of a system at any given time. For end users, this means that problems can arise and manifest themselves into primary and secondary storage systems being overloaded during transfers. The result of overloaded systems is that backups may fail to run, backup service level objectives may not be met, replication may fall behind schedule or any combination of those.

Present tools available to network operators may help them select the shortest route or path within a network. These tools, however, only look at items like latency, number of dropped packets and other similar quality metrics. They lack other useful information, such as exact size of the transfer along with historical information to determine not only the best path but also the best time to transfer the data.

What is needed, therefore, is data protection software that provides an effective way to decouple the stages of backup and optimize data transfers across the network by determining best times to transfer data as well as best paths.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 7 is a table that illustrates certain example historical operating information for a system, under an example embodiment.

FIG. 8 is a table that illustrates example results for the calculations for the historical data of FIG. 7, under an example embodiment.

FIG. 11A is a table illustrating times required to transfer backups in a default order in an example embodiment.

FIG. 11B is a table illustrating times required to transfer the backups of FIG. 11A using the multi-backup informed policy creation process of FIG. 10, under an example embodiment.

DETAILED DESCRIPTION

Figure 1A:
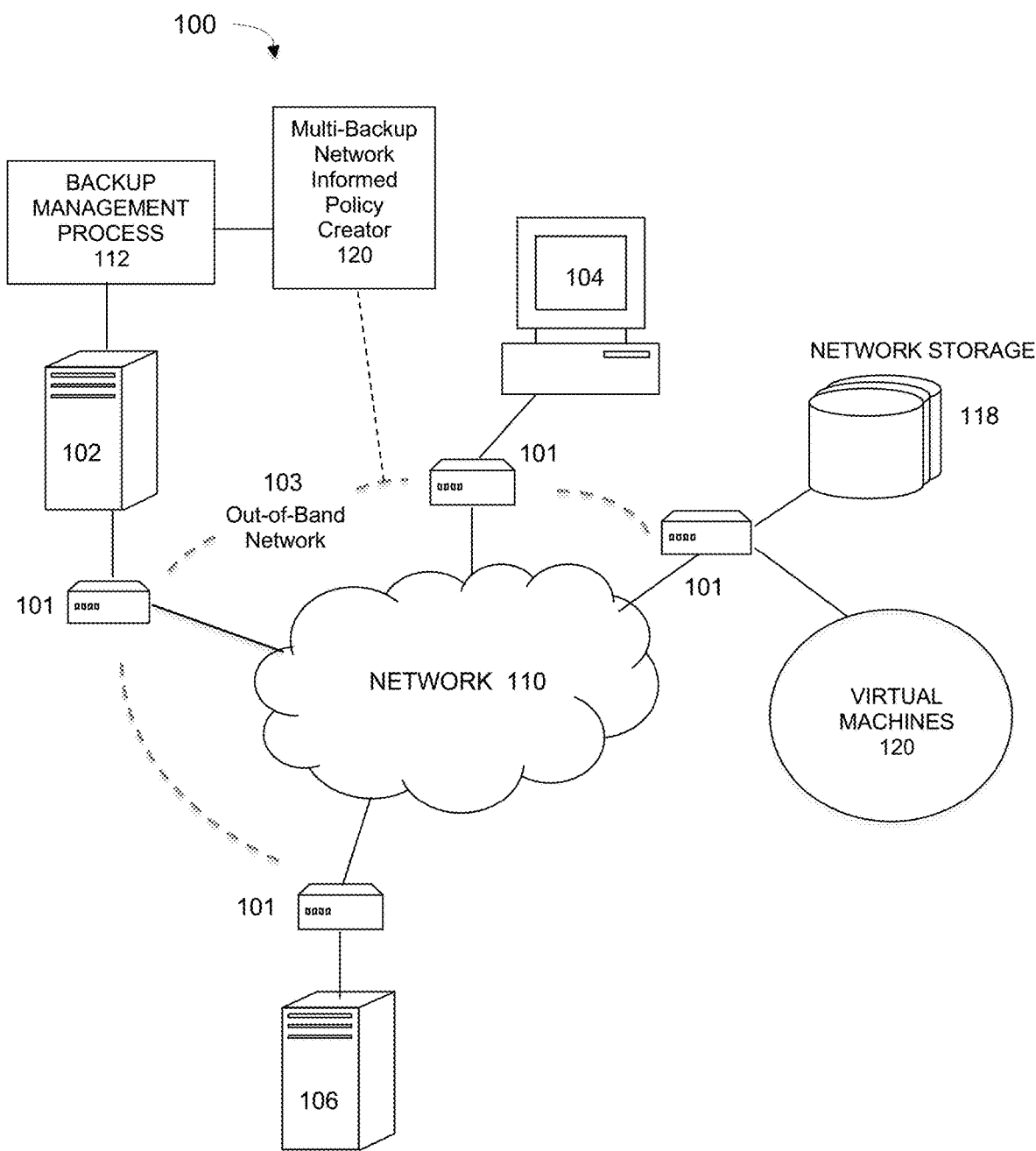
FIG. 1A is a diagram of a network implementing a network informed policy creator for a data backup system, under an embodiment.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud-based network system or very large-scale wide area network (WAN), and metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Networking equipment such as managed switches, core routers and firewall devices have important configuration data that is stored on each device. These configurations include network (e.g., VLAN) tags, per port activation/link speed, domain routing protocol (e.g., BGP/OSPF) settings, firewall rules, high availability/redundancy settings, and so on, and are generally critical to running a network.

In embodiment, each network device (switch, router, firewall, etc.) has their management network port connected to an out-of-band network, which is a secured and limited access network used to configure and monitor all network devices, and which is not accessible by the production network. The production network is a series of networks that customers may sub-divide with the use of VLANs or additional routes.

FIG. 1A illustrates a computer network system that applies network informed policy creation for data protection using out-of-band network equipment devices, under some embodiments. For network 100, a number of network resources, such as server computers 102, 106, desktop or portable computers 104, storage devices 118, and other similar system resources.

For the embodiment of FIG. 1A, at least one server 102 may be a backup and/or storage server that executes a data storage or backup management process 112 that coordinates or manages the backup of data from one or more data sources to storage devices, such as network storage 118, client storage, and/or virtual storage devices 120. With regard to virtual storage, any number of virtual machines (VMs) or groups of VMs (e.g., organized into virtual centers) 120 may be provided to serve as backup targets. The VMs or other network storage devices serve as target storage devices for data backed up from one or more data sources, such as storage server 102 or other data source, in the network environment. The data sourced by the data source may be any appropriate data, such as database data that is part of a database management system, and the data may reside on one or more hard drives for the database(s) in a variety of formats.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 118, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The network server computers are coupled directly or indirectly to each other and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

For the embodiment of FIG. 1A, each computer, storage device, or other resource is connected to network 110 or other resources through some sort of network equipment or interface device 101. Such as device may be switch, router, modem, load balancer, buffer, or some other similar device that conditions the data or otherwise facilitates interface of the computer (e.g., 102, 104, 106) with the network 110. The interface may be embodied as an external device, or it may be at least partially integrated with the computer itself.

In an embodiment, the network equipment devices 101 are part of an out-of-band network 103, which is an abstraction of the actual network connectivity among these devices to show that they are subject to out-of-band management protocols that involve the use of management interfaces or serial ports for managing and connecting this equipment. Such out-of-band management usually involves the use of a dedicated management channel for device maintenance. It allows a system administrator to monitor and manage servers and other network-attached equipment by remote control regardless of whether the machine is powered on, or whether an operating system is installed or functional, and is in contrast to in-band management that involves simply connecting to a switch using normal network connectivity. Out-of-band management allows the network operator to establish trust boundaries in accessing the management function to apply it to network resources, and to ensure management connectivity.

In an embodiment, network devices 101 (also referred to as "network equipment" or "network equipment device" or "network interface devices") can be considered any of the following: managed switches, core routers, firewalls, load balancers, and so on. For the purpose of description, embodiments will be generally described with respect to managed switches, however it should be noted that embodiments are not so limited and may include any type of network equipment, interface, or infrastructure device.

Figure 1B:
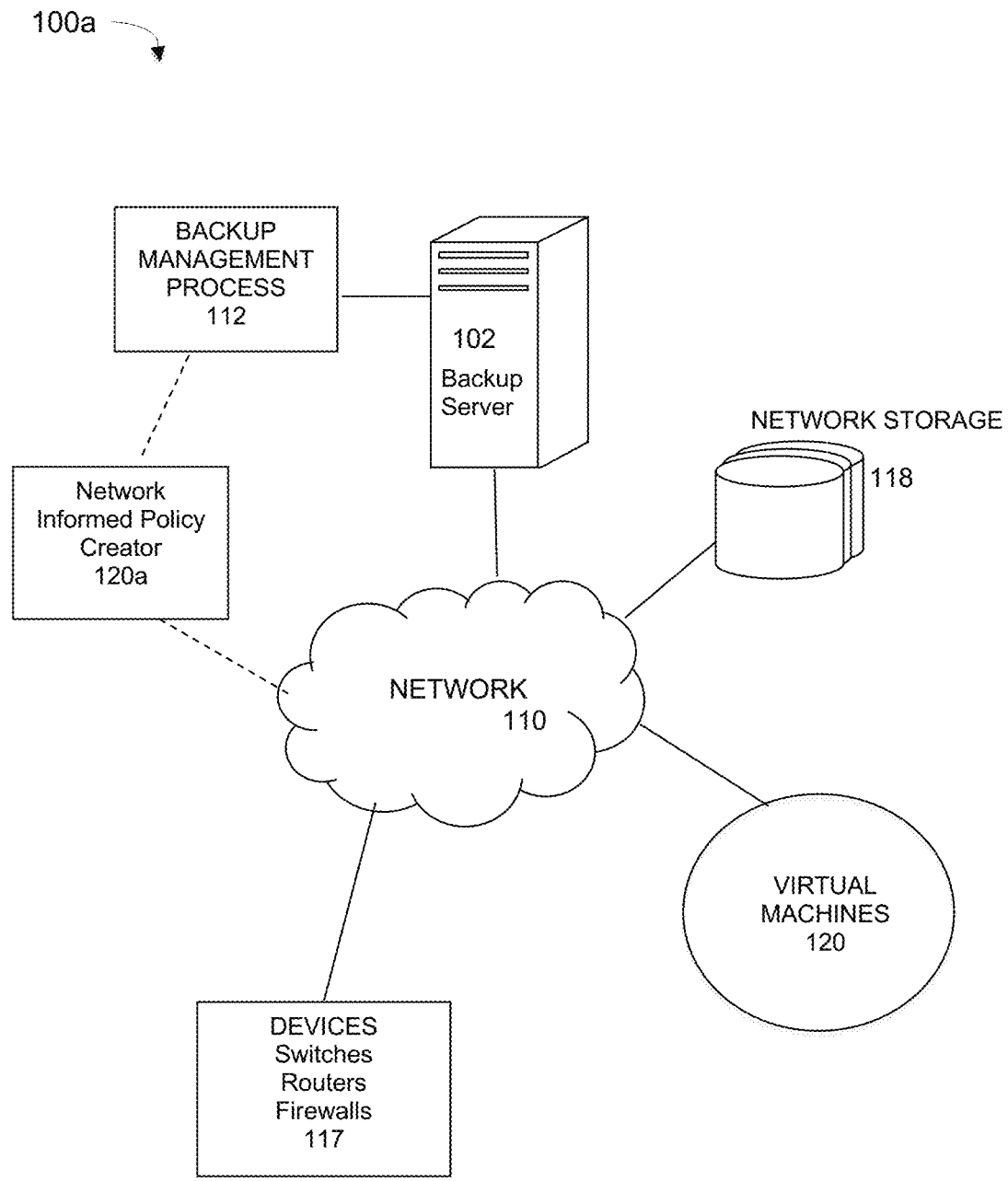
FIG. 1B is a diagram of a network implementing a network informed policy creator for a data backup system, under an alternative embodiment.

FIG. 1A illustrates an embodiment in which the network IPC 120 gathers network device information such as traffic flow through a special and separate out-of-band (OOB) network 103. Alternatively, the network IPC 120 can be deployed directly on the source and target, if allowed, to monitor network data flow of each source and target. FIG. 1B illustrates a computer network system 100a that implements one or more embodiments of implementing a network informed policy creator, under an alternative embodiment. In this embodiment, the network informed policy creator 120a is provided as a component or executable function provided in or accessible by the backup management process 112. The network includes devices 117 that may comprise switches, routers, firewalls, and so on. The network IPC 120a works through software agents installed on both the source and target. The agents gather the information that would normally be provided to the network switch as in the out-of-band network embodiment of FIG. 1A.

As stated previously, current backup systems limit application of single policies on all stages of a backup operation thus leading to unpredictable load distribution and potential backup operation failure. Embodiments include a network informed policy creator (IPC) component or process 120 that is integrated into or accessed by the backup software 112. The network IPC process 120 connects with network devices 101 (e.g., managed switches, routers and firewall) to monitor the flow of data between source and destination. It is configured to recommend the transfer stage start time so it can be run later and independent of other stages. Process 120 also keeps a history of data to improve recommendations of the transfer stage within the transfer window based on flow of data and available resources on source and destination. Based on these three items, the network IPC 120 helps to back up the data during the transfer window and, when appropriate, transfer that data to the destination during the same transfer window. The network IPC 120 connects to network devices at both source and destination, and determines the impact of migrating the data based on historical trends and choose the best time to transfer data during the transfer window.

For the embodiment of FIG. 1A, the network IPC 120 may be implemented as a component that runs within a data protection infrastructure, and can be run as an independent application or embedded into an instance of data protection software 112 or as part of a data protection appliance. Any of those implementations may also be on-premise implementations on client machines within a user's data center or running as a hosted service within the cloud.

Network device information, such as traffic flow, is generally not available on the production ports of switches, but rather on a special and separate out-of-band (OOB) network 103. In order for the network IPC process 120 to gain access to the management interfaces, it needs to be dual-homed with access to the production network in order to communicate with backup softwaren 112, and the management/out-of-band network 103, which network switches 101 are connected to. This type of setup requires additional security and considerations that are explained in greater detail below.

Implementing the network IPC 120 thus involves getting access to the management interfaces of network devices. The network IPC thus needs to be properly installed and implemented to be dual-homed, that is, to have access to both the out-of-band network and production network.

Figure 2:
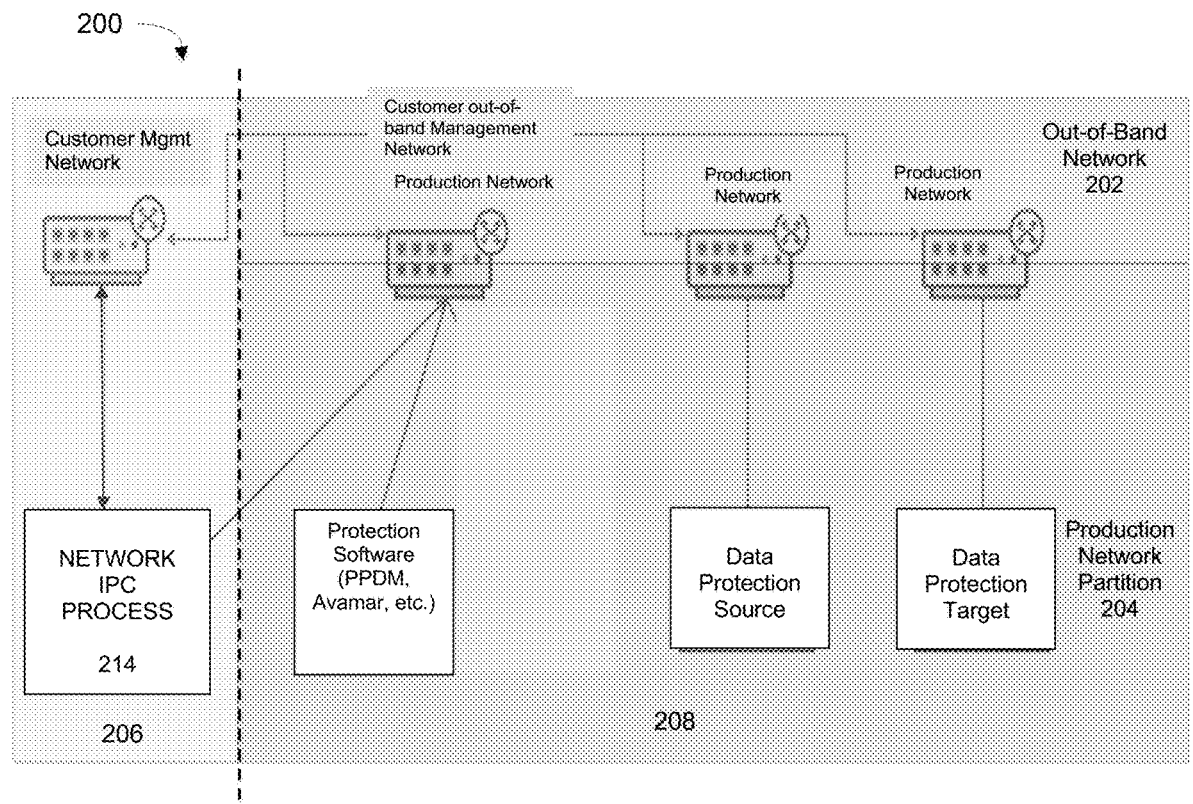
FIG. 2 illustrates an example user network that implements a data protection networking device process, under some embodiments.

FIG. 2 illustrates an example user network that implements a data protection networking device process, under some embodiments. System 200 represents a network comprising a number of user resources, such as production software, protection storage, client server computer, and devices in a production network 204. These resources are coupled to a network through network devices in out-of-band network 202, which is a secured and limited access network used to configure and monitor all network devices that is not accessible by the production network. Each network device (switch, router, firewall, etc.) has their management network port connected to the out-of-band network. The production network 204 comprises a data protection source and a data protection target, but embodiments are not so limited.

For the embodiment of FIG. 2, section 206 represents the network region where the network IPC process 214 is installed. This is a dual-homed component or process in that it has access to both the out-of-band network 202 and the production network 204. Region 208 includes the resources and network devices that are managed by network IPC process 214. The network IPC process 214 may be deployed externally as a VM/physical device within the network or it could be embedded within one or more of the network devices. There may also be multiple instances of network IPC in the customer network. The protection software and storage may be in the production network or in the out-of-band network, or it may even be hosted as a service. For purposes of description, IPC process 214 will be described as a single instance implementation that is dual-homed (i.e., access to out-of-band and production network) and a local instance of protection software and storage, though embodiments are not so limited.

Each network device (e.g., managed switch, a firewall or router) usually has a different method for programmatic control. The traditional industry standard for such control has been Telnet, which is used to administer commands on devices through the use of command line interfaces (CLIs). Due to the insecurity of Telnet, best practices have led to network devices being put on restrictive 'management' networks, such as an out-of-band network. As security improved, other methods such as SSH (Secure Shell) and Rest APIs were added, but the practice of putting the management interface on an out-of-band network is still a viable solution.

Depending on the network device, model, version and the customer configuration, the network IPC process 120 is configured to support each of the following controlling interfaces: Telnet, SSH, ReST API, RestCONF, and vendor specific or similar protocols. In an embodiment, the network IPC process supports a pluggable driver model which adds flexibility to handle a wide variety of network devices. Each driver will support a common set of use cases, such as: commit, backup, and restore operations.

Figure 3:
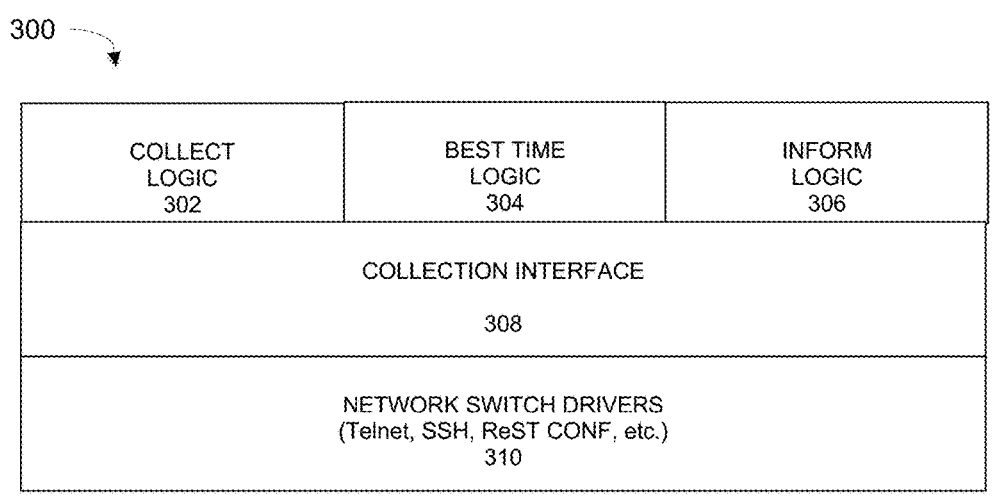
FIG. 3 is a sample driver model and implementation within the data protection networking device process software, under some embodiments.

FIG. 3 is a sample driver model and implementation within the network IPC software, under some embodiments. The software model 300 of FIG. 3 comprises a first layer having collect logic 302, best time logic 304 and inform logic 306; a collections interface layer 304; and a drivers layer 306. The network switch drivers 306 represent drivers that support the interfaces listed above, i.e., Telnet, ReST, CONF, and so on.

A typical system may have many network switches from various vendors that each have their own APIs and specific ways to communicate. For example, some network switches implement a standard called RESTCONF for device management, while other network switches require SSH or even Telnet to achieve the same functionality. For this reason, network IPC 214 is configured to use a pluggable driver model where each driver implements the specific network management protocol which is abstracted by the collection interface. The collection interface 308 offers a generic interface to all switches, regardless of their communication protocol where the process creates the three high level functions of the first layer, namely: collect 302, best time stages 304, and inform 306.

Figure 4:
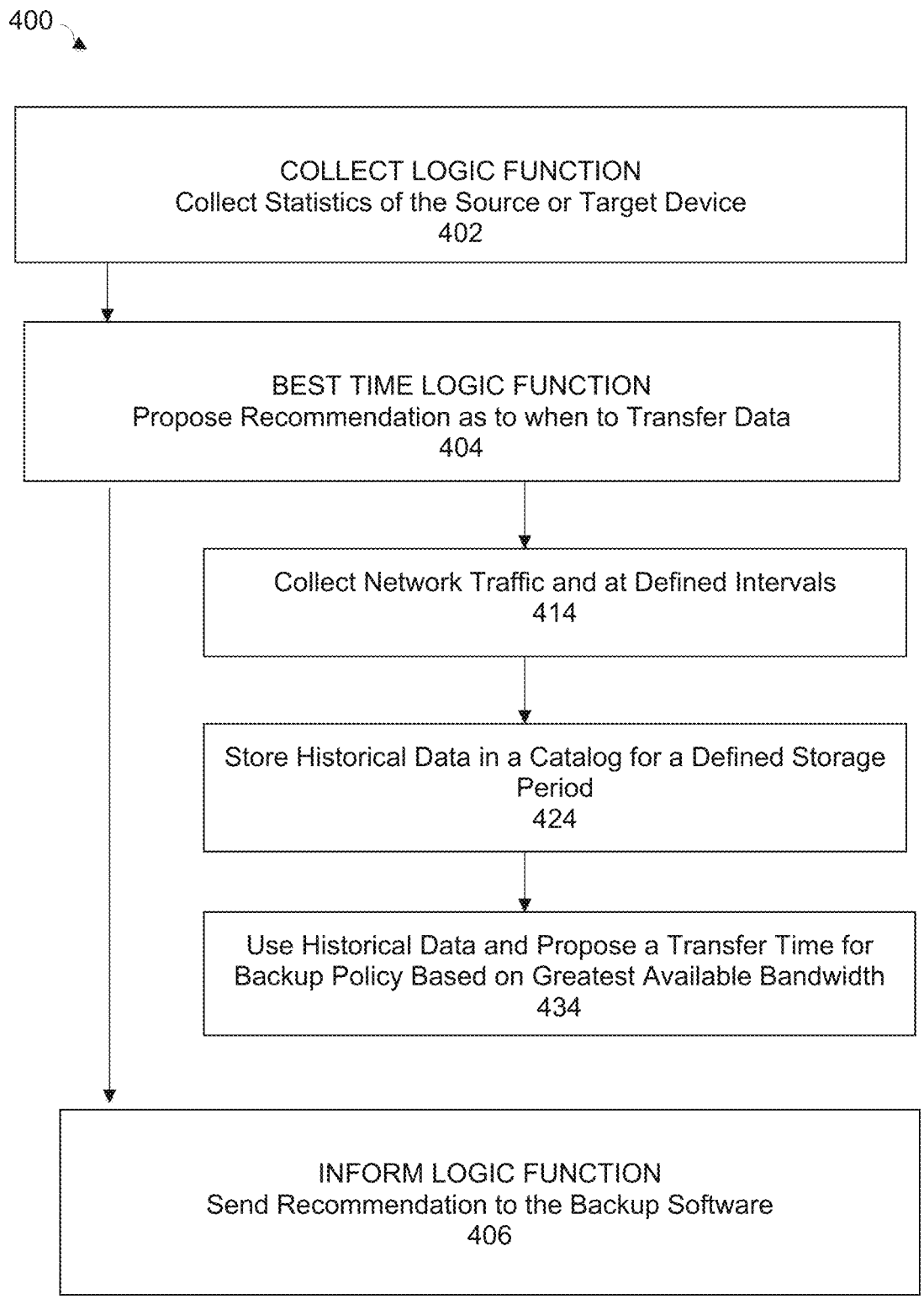
FIG. 4 is a flow diagram that illustrates major functions of the driver layers of the network IPC process, under some embodiments.

FIG. 4 is a flow diagram that illustrates major functions of the driver layers of the network IPC process, under some embodiments. As shown in process 400, the collect logic function 402 connects to each network device and collects the current statistics of the source or target device. The statistics include network bytes received and sent, and any other relevant information.

The best time logic function 404 uses the results from the collection function to propose or recommend an optimum time for the backup software to perform the data transfer of the backup operation.

The inform logic function 406 will send the recommendation proposed by the best time function to the backup software 112. Similar to pluggable drivers for network device management, the inform function 406 can be abstracted so that different protection software can be used with the network IPC.

A main process of FIG. 4 is the best time logic function 404, which provides recommendations as to when the backup software should transfer the data between source and target for a backup. As mentioned earlier, backups can be broken down into stages, such as first taking a snapshot of a block device, and second transferring the snapshot to secondary storage. Additional stages might follow, such as tiering the data offsite from secondary storage, and so on. The best time function works on the data transfer stage as opposed to the backup or any subsequent stage of the entire backup operation. Within every backup, there are multiple stages or steps, where the first step is to back up the data, and the second step is to transfer the data. The best time logic function operates on the second step of the data transfer wherein once the data has been backed up, it provides an option to transfer the data at separate time from the backup stage given the network resources.

The Best Time Algorithm works by figuring out how long the transfer will take for each available transfer window (the 20-minute configurable interval) and matching it to which backup it should transfer within that interval. It does this for each combination that makes sense and then picks the one with the fastest time In order to figure out when to optimally transfer the data, and as shown in FIG. 4, the best time logic function 404 performs several sub-steps. The first main sub-step performed by the network IPC is to collect network traffic, such as incoming and outgoing bandwidth and the network uplink speed, 414. The network IPC collects the data continuously at intervals, such as every minute, or similar time period. The network IPC collect this data using the collect function 402.

This network traffic information is then stored as historical data points in its own catalog, 424. The storage period can be defined as any appropriate length of time, such as 30 days, 60 days, or any other defined period.

Once the data has been stored, the network IPC will look at the historical data and, based on the backup policy it is operating on, will propose a transfer time where the greatest amount of network bandwidth is available between source and destination, 434. This proposal does not eliminate any bottlenecks that might encountered by performing the transfer at the proposed time, but rather it goes for a best effort. The proposed time is then sent as a recommendation to the backup software by the inform logic function 406.

Figure 5:
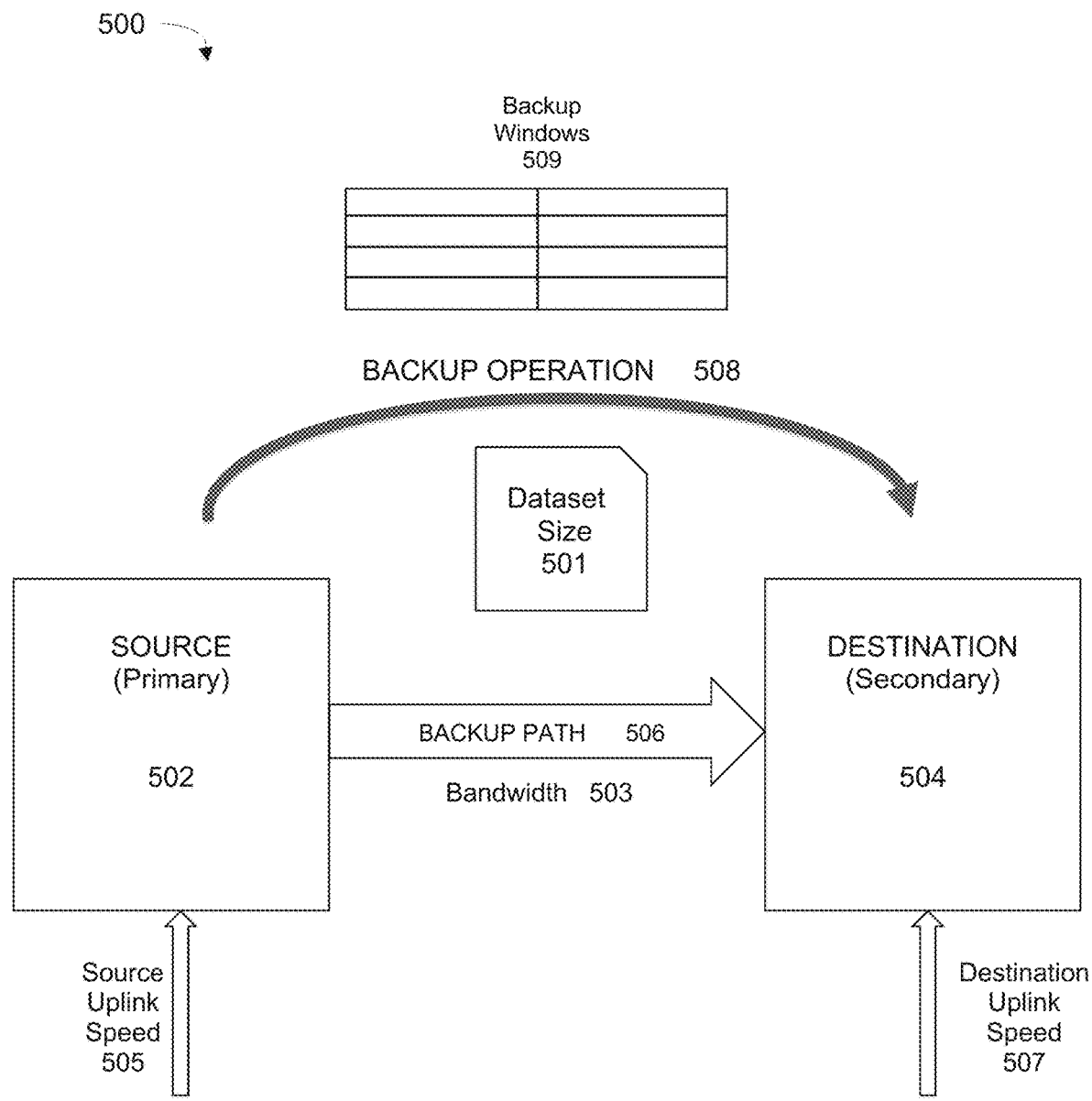
FIG. 5 is a block diagram illustrating some components and parameters for the network IPC process, under some embodiments.

As shown in FIG. 4, the network IPC determines the greatest amount of bandwidth available between source and destination as part of the calculation of the best time for the data transfer. This calculation depends upon several operating and configuration parameters of the backup network and backup dataset. FIG. 5 is a block diagram illustrating some components and parameters for the network IPC process, under some embodiments. FIG. 5 illustrates a system 500 comprising a data source 502 and storage device destination 504 for which a backup operation 508 transfers a set of data to be backed up (dataset) 501 from the source 502 to the destination 504. Several different network paths may be available between the source and destination, and for purposes of description, a defined backup path 506 (which is typically, but may not always be a shortest path) is assumed as the path used for the backup operation 508.

The backup operation 508 is typically executed by the backup software according to a backup schedule that dictates routine backups to be made at regular periodic intervals, e.g., hourly, daily, weekly, etc. Depending on the size of the dataset and backup type (e.g., full, incremental, differential, etc.), a backup operation may take a minimal or significant amount of time. Typically, the backup periods are chosen so that a full backup may be completed within the time before the next scheduled backup. The backups may be taken at a set time during the period, such as 12:01am every day. However, backup software often provides a number of different backup (or transfer) windows 509 to be selected for the backup operation, thus allowing for some degree of optimization with respect to when the backup operation is performed within the entire backup period. Depending on different system constraints, operating conditions, device health, and so on, certain transfers may be better than others for a certain scheduled backup operation.

Unlike present backup optimization techniques that focus on selecting the shortest path between the source and destination, the network IPC process selects the best time to transfer the data from among different possible transfer windows based on data transfer sizes and historical data about network bandwidth conditions. Thus, for a particular source 502 and destination 504 across a backup path 506, the network IPC process will process certain historical bandwidth 503 metrics, along with source uplink speeds 505 and destination uplink speeds 507 to determine the best time within the backup windows to transfer a dataset 501 having a particular size.

Figure 6:
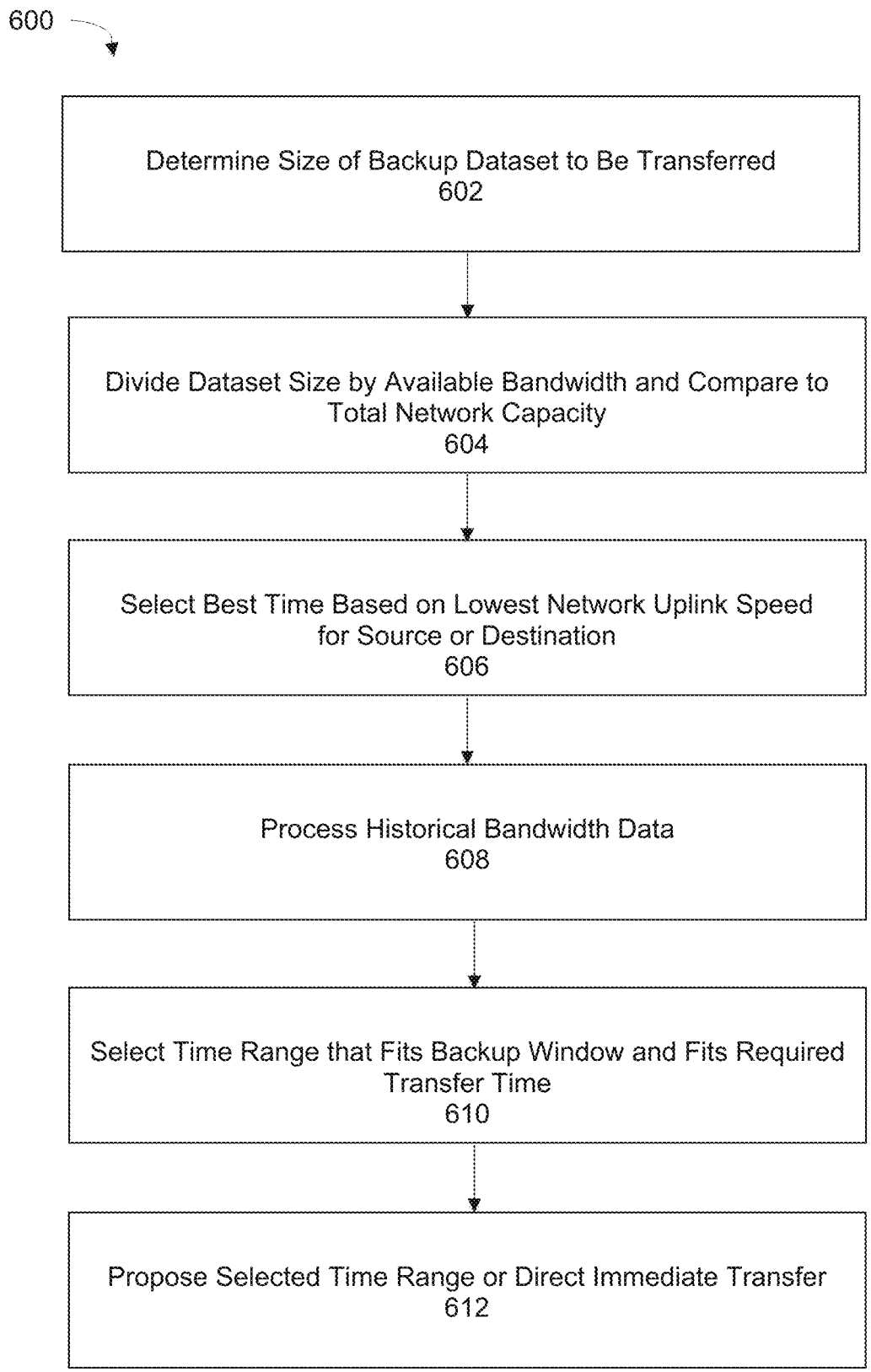
FIG. 6 is a flowchart illustrating a method of calculating the greatest available bandwidth for the optimal transfer time proposal, under some embodiments.

As shown in FIG. 4, a major step (434) in determining a best time to recommend as a backup time is using historical data based on the greatest bandwidth 501 available for the backup path 506. FIG. 6 is a flowchart illustrating a method of calculating the greatest available bandwidth for the optimal transfer time proposal, under some embodiments. For each source and destination, process 600 determines the size of the data that will be transferred, 602. This is generally provided from an earlier stage where the snapshot was taken by the backup software. The best time logic function 404 determines the best time to perform the data transfer data stage after the backup or snapshot phase. The size of the dataset is determined based on the backup stage for the dataset that is then transferred from primary to secondary storage.

The process 600 then takes the total size of the backup and divides it by the available bandwidth for comparison to the total network capacity, 604. With respect to calculating the total network capacity, the network IPC gathers statistics from the network switches about the source and target machines. The network switch provides the uplink speed (e.g., 1 Gbps, 10 Gbps, etc.). Along with that, it also provides how much of that uplink is used (e.g., 500 Mbps, 5 Gbps, etc.). This information is collected in the historical database. How often this information is collected is selected through a user configurable setting. In this example, the time period is every 20 minutes, though other periods are also possible.

Given this information, the process knows the maximum bandwidth available on source and target (destination), which is the uplink speed number. Then for a given time range, the database provides the past historical usage. The difference represents what is left as available to the system. The process uses the lowest bandwidth available between source and target for the entire transfer, as that is the bottleneck between the two systems. The result of this calculation is a time value. If the source and destination network uplink speeds differ from one another, then the lowest network uplink speed is selected, 606.

For the transfer windows provided by the backup software, the process 600 processes the historical bandwidth data 608, and for the given time period and selects the time that (1) fits the transfer window, and then (2) fits the required transfer time (i.e., how long the transfer will take), 610. The selected time is then sent to the backup software as the recommended proposal. If both conditions (1) and (2) above cannot be met, the network IPC process will direct the backup software to start the transfer immediately, 612.

For the source, the network IPC will only look at historical data that matches outgoing bandwidth. For the destination, the network IPC will only look at historical data for incoming bandwidth.

This process 600 of FIG. 6 can be expressed by the following best time equation: Best_Time=(total_backup_size)/(network_uplink_speed-available bandwidth) over a specified period, e.g., 30 days.

Embodiments will be further described with respect to a specific example as illustrated in FIGS. 7 and 8. FIG. 7 is a table 700 that illustrates certain example historical operating information for a system, under an example embodiment. Table 700 lists certain bandwidth 702 and uplink 704 metrics for a primary (source) device and a secondary (destination) device for four different transfer windows. The transfer windows are timestamped as Monday 12:00AM, Monday 12:20AM, Monday 12:40AM, and Monday 1:00AM. Table 700 represents just a portion of an entire historical set of data over an entire backup period of 30 days or similar. The granularity of 20 minutes between each transfer window represents a defined collection interval for the network IPC process, and can be changed to any appropriate value, such as 10, 15, or 30 minutes, and so on.

The historical information of example table 700 is recorded in the network IPC catalog and stored in a database accessible to both the primary and secondary devices. This historical information is then applied to a defined or provided backup policy. For example, such a policy may dictate the backup software to back up a block device of 75 GB in size between the one-hour window of 12AM-1AM. From the table 700, it can be seen that the primary device has a 10 Gbps uplink while the secondary device has a 1 Gbps uplink and the collection interval for the network IPC is every 20 minutes. From the defined policy, a next backup is scheduled to occur at 12AM on Monday. Based on the process of FIG. 6, the network IPC will consult the historical database 700 and perform certain calculations as follows.

The primary device has a network uplink for 1 Gbps even though the primary device has a 10 Gbps uplink. This is because the secondary device has a network uplink of 1 Gbps and the better time calculation in step (2) states the lowest uplink value is used.

The available bandwidth at 12AM on the primary device 9,000 Mbps or 9 Gbps. This value is calculated by taking 10 Gbps uplink and subtracting the 1,000 Mbps outgoing bandwidth. The available bandwidth at 12AM on the secondary device is 200 Mbps. This value is calculated by taking the 1 Gbps uplink and subtracting the 800 Mbps of incoming bandwidth. Due to 200 Mbps being the lowest value between primary and secondary, 200 Mbps is used as the transfer rate. The Mbps value is converted to MB/s as follows: 200 Mbps=25 MB/s. The network IPC process uses the formula defined above and plugs in the values: 75 GB (backup size)/25 MB/s=3000 seconds or 50 minutes. This 50 minutes is the amount of time the backup will take for the 75 GB dataset.

The network IPC process then performs the same calculation at the 12:20AM, 12:40 and 1AM entries. FIG. 8 is a table 800 that illustrates example results for the calculations for the historical data of FIG. 7, under an example embodiment. As can be seen in FIG. 8, the network IPC process will determine is the optimal transfer window can occur anytime between 12:20AM-12:40AM as the process has calculated that the transfer can be completed within 10 minutes and 12 seconds if this time window is selected. If the backup software did not use the network IPC process, it would start the transfer stage as soon at 12AM and would take as long as 50 minutes. This is because less bandwidth being available at 12AM. In addition, transferring at 12AM might cause a chain reaction of other systems being slowed down that would further cause slowness and ripple throughout the network. Thus, in this example, a later time window is better than an earlier time window and allows the backup operation to complete faster even though it starts later.

Multi-Backup Network Informed Policy Creation

Embodiments above describe a best time algorithm within a network informed policy creator system in which an entire period is broken up into blocks of time (transfer or backup windows) where a constant bandwidth is available An optimal time to transfer a single backup over the network is then calculated. Such embodiments are extended in the multi-backup network informed policy creator 120 to process account multiple backups occurring at the same or similar time between a source and destination so as to produce an optimal time to transfer all backups over the network rather than just a single backup.

Figure 9:
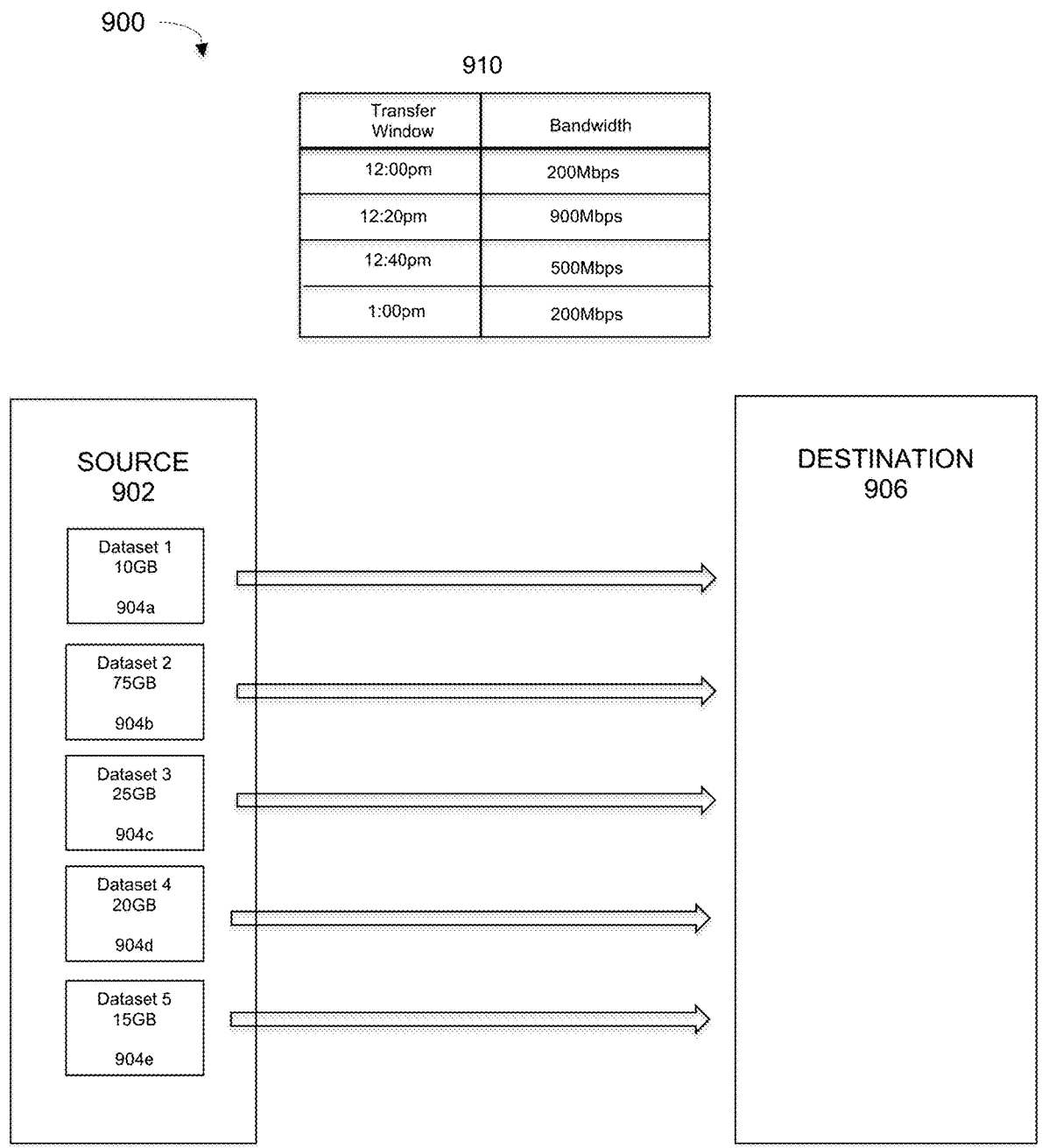
FIG. 9 illustrates an example scenario of multiple backups between a source and destination, under some embodiments.

FIG. 9 illustrates an example scenario of multiple backups between a source and destination, under some embodiments. Diagram 900 shows a source 902 having five example datasets (e.g., datasets 1 to 5), 904a-904e. Any number of backups are possible, and each backup can be the same or different sizes. For the example shown, the datasets vary from 10 GB to 75 GB in size, as shown. As shown, the different datasets 904a-e are all to be backed up at the same time according to a specific user-defined backup schedule 910. The backup schedule thus defines a period during which the multiple backups are performed to transfer the datasets from source 902 to destination 906, such as, daily, weekly, etc. The backup schedule may include a number of different backup or transfer windows during which the data can be transferred within the specified period. For example, for a daily backup, there may be four (or similar number) transfer windows available at a particular time of day (e.g., 12PM or 12AM). The transfer windows are each of a set period of time, such as 20 minutes or similar. The transfer can be initiated during any transfer window from the start time (12PM) and must be complete before the end of the final transfer window to satisfactorily backup all the datasets to the destination 906 for the current backup period.

Although the duration of the transfer windows are all the same, their bandwidth capacities may not be the same due to factors such as network traffic, system load and configuration, and so on. Thus, for the example shown in FIG. 9, four example 20 minute transfer windows are shown starting at 12:00PM. The available bandwidth for the 12:00-12:20PM window is 200 Mbps, the available bandwidth for the 12:20-12:40PM window is 900 Mbps, The available bandwidth for the 12:40-1:00PM window is 500 Mbps, and the available bandwidth for the 1:00-1:20PM window is 200 Mbps. FIG. 9 is shown for purposes of illustration only, and any other configuration of source, destination and network links is also possible.

The multi-backup network informed policy creation process 120 utilizes the fact that the minimum time to transfer backups can be achieved by performing the backups within a defined transfer according to the largest backup size (e.g., 904b in FIG. 9) and the largest available bandwidth (e.g., 12:20PM in FIG. 9). Process 120 matches these two relevant factors so that the largest dataset is backed up during the transfer window with the greatest available bandwidth so that all of the transfers are fit within high bandwidth window or windows. This minimizes the overall backup time, even if it results in a later transfer window within the backup period being used.

In an embodiment, the multi-backup informed policy creation process 120 keeps historical records of bandwidth available between source and destination for each backup system. By using these historical records, process 120 can leverage this information beyond just a single backup. Certain parameters regarding the historical database are configurable, such how long historical records are kept (duration), amount of data that is kept (depth), and so on. This allows a user of the system to control the overall accuracy of the historical information.

Table 910 illustrates certain example historical operating information for system 900, for four different possible transfers within a backup schedule. The transfers are time-stamped 12:00PM, 12:20PM, 12:40PM, and 1:00PM. Table 910 represents just a portion of an entire historical set of data over an entire backup period of 30 days or similar. The granularity of 20 minutes between each transfer represents a defined collection interval for the network IPC process, and can be changed to any appropriate value, such as 10, 15, or 30 minutes, and so on. The average bandwidth recorded for each of the transfers is shown as 200 Mbps, 900 Mbps, 500 Mbps, and 200 Mbps, respectively. For this example, it can be seen that the 12:20pm transfer provides the greatest bandwidth capacity (900 Mbps).

Given the different size datasets and the different bandwidth capacities available for different transfers within the backup period, different orderings of the backups may produce different time durations. Embodiments of the multi-backup IPC process 120 uses historical data and current system characteristics to determine the optimum scheduling of the various backups based on the different bandwidth and dataset size characteristics to possibly improve the performance of a simplistic default or rigid scheduling of backup jobs in a set order.

Figure 10:
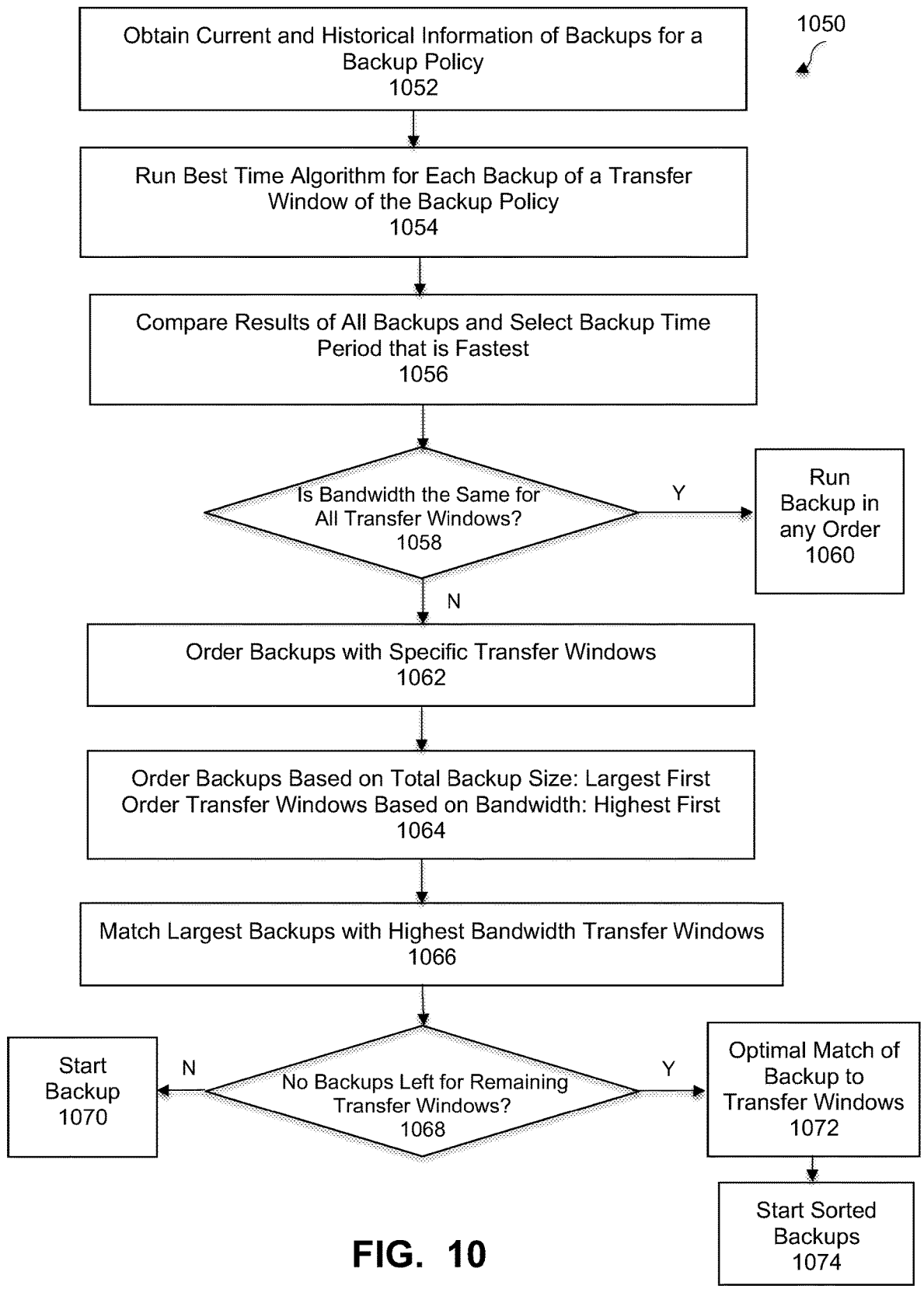
FIG. 10 is a flowchart illustrates performing a multi-backup network informed policy creation process, under certain embodiments.

FIG. 10 is a flowchart illustrates performing a multi-backup network informed policy creation process, under certain embodiments. Process 1050 begins with obtaining current and historical information of backups for the a given backup policy, 1052. For a given backup policy, this involves getting a list of: all backups, the amount of data transferred over the last 30 (or other similar) number of days, the policy transfer window, the source machine, the destination machine, among other relevant information. This comprises the current information of the system.

For a given policy transfer window, the process runs the Best Time Algorithm for each backup for the transfer window, 1054. The process then compares the results of all backups and select the backup transfer time period that is the fastest, 1056. This comprises the historic information of the system.

In step 1058 it is determined if the same amount of bandwidth is available for entire transfer window. That is, each of the transfer windows (e.g., 910) have equal bandwidth capacities. If so, the backups can be run the backup in any order as the backup time duration cannot be further shortened, 1060.

If, however, the same amount of bandwidth is not available over the transfer window, the backups are ordered or re-ordered into different transfer windows, 1062. This ordering proceeds as follows: (1) order backups based on total backup size with the largest backup first, and (2) order transfer windows based on bandwidth with the highest bandwidth windows first, 1064.

The process then matches the largest backups with the highest bandwidth transfer windows to backup first, 1066, and repeats until till there are no more backups or transfer windows. In decision block 1068 it is determined whether or not backups are matched with zero or more transfer windows remaining. That is, do any backups still exist for the remaining transfer windows. If not, and the transfer windows run out before backups, the backup is started with the present transfer window, as no ordering or re-ordering will complete all backups within all the transfer windows, 1070. If, however, the backups run out before transfer windows, the optimal solution has been found in the last match of the backup to the transfer window, 1072. The backups are then performed as re-ordered (or sorted) by the matching process, 1074.

Embodiments are described by way of an example case as illustrated in FIG. 9. As shown in FIG. 9, there are five backups that total 145 GB (10 GB+75 GB+25 GB+20 GB+15 GB) of data to be transferred between 12PM and 1:20PM (transfer windows) with the following respective bandwidths available: 200 Mbps, 900 Mbps, 500 Mbps, and 200 Mbps.

The system has been configured to record the bandwidth every 20 minutes and save them over a period of time. The network IPC produced the transfer windows 910 with the average bandwidth available. The IPC process 120 determines which backup should go with which transfer window. As a first step, the normal case of starting transferring the backups in a default dataset order (i.e., 1 to 5) is calculated. This example is illustrated as Table 1100 of FIG. 11A. In this ordering, it would take 36 minutes and 52 seconds to transfer all the backups, with the backup of dataset 2 requiring two transfer windows in a row (12:00PM and 12:20PM). This represents a default situation of taking backups in order.

In contrast, the multi-backup IPC process of FIG. 10 produces a modified best time result of the ordering illustrated in Table 1110 of FIG. 11B. The total time required for all five backups is 22 minutes and 40 seconds, when the backups are executed in the order shown and in the transfer windows shown. For this example, the backup of dataset 2 is ordered to be first due to its biggest dataset size (75 GB), and it is scheduled in the 12:20PM transfer window as this is the transfer window with the largest bandwidth (900 Mbps). The next biggest backup is for dataset 3 (25 GB) and this is also placed in the 12:20PM transfer window. As shown in Table 1110, this transfer window can also accommodate the backups for datasets 4 and 5, while the remaining backup (dataset 1) is performed in the next transfer window (12:40PM). This illustrates a case in which starting the backup in a later transfer window that has a high capacity and starting with the largest dataset can result in an overall lower total backup time as compared to simply starting the backup in with the first transfer window and in a default backup order. FIGS. 11A and 11B are provided for illustration only, and any other backup configuration is possible.

As shown in the examples of FIGS. 11A and 11B, the multi-backup IPC process transfers the data in less time and reduces network congestion by more efficiently using all of the bandwidth that is available in the different transfer windows and by changing the default order of backup job execution.

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 12:
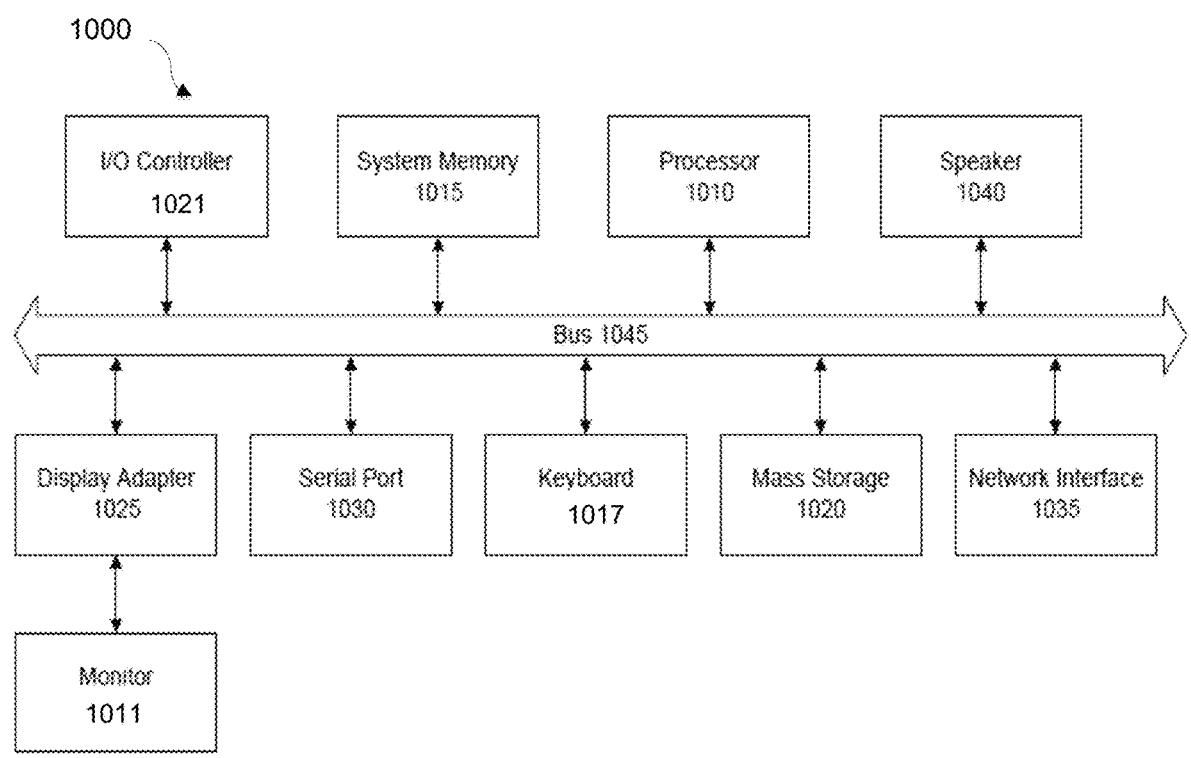
FIG. 12 is a system block diagram of a computer system used to execute one or more software components of a multi-backup network informed policy creation process, under some embodiments.

The network of FIG. 1A may comprise any number of individual client-server networks coupled over the Internet or similar large-scale network or portion thereof. Each node in the network(s) comprises a computing device capable of executing software code to perform the processing steps described herein. FIG. 12 shows a system block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of optimizing multiple backup operations for a data protection system, comprising:
    initiating a plurality of backups to be performed between a source and a destination, each backup transferring a dataset of a respective size;
    defining a plurality of transfer windows for transferring a dataset from the source to the destination, each transfer window having a respective bandwidth capacity;
    first ordering the backups based on decreasing backup dataset size, with largest dataset ordered first;
    second ordering the backups based on transfer windows based on decreasing bandwidth capacity, with highest bandwidth capacity first; and
    matching the largest dataset backup with the highest bandwidth capacity transfer window until at least one of: all of the plurality of backups are scheduled in at least one transfer window, or all transfer windows are occupied.

2. The method of claim 1 wherein the backup operations each implement a policy that specifies a plurality of service requirements and that is initiated at a time within the plurality of transfer windows.

3. The method of claim 2 further comprising:
    determining, for each backup of the plurality of backups, a size of each dataset to be backed up by the respective backup;
    monitoring a flow of data between the source and destination for the respective backup;
    compiling historical data of operational parameters for transfers of datasets between the source and destination for the plurality of backups; and
    determining an optimum time within the plurality of transfer windows based on the dataset size and the historical data for each backup of the plurality of backups.

4. The method of claim 3 wherein the historical data is used to establish bandwidth data used to derive the respective bandwidth capacities of each transfer window.

5. The method of claim 3 wherein the network devices comprise out-of-band devices coupled to other network equipment devices through a network implementing out-of-band protocols, and further wherein the network devices comprise at least one of managed switches, routers, or firewall devices.

6. The method of claim 5 wherein the network comprises the out-of-band protocol network and a production software network coupling a plurality of computers together for the execution of one or more applications.

7. The method of claim 2 wherein each policy is selected from a plurality of backup policies specifying a target storage location of the destination, a recovery time objective, and a recovery point objective for data backed up under the backup policy.

8. The method of claim 3 further comprising transmitting the determined optimum time as a proposed time to transfer the dataset from the source to the destination after a snapshot backup executed by the data protection system.

9. The method of claim 3 wherein the operational parameters comprise at least one of: incoming and outgoing bandwidth for each of the source and destination, and uplink speed for the source and destination.

10. A computer-implemented method of optimizing backup operations for a data protection system having a source and a destination, comprising:

collecting network traffic information including network bandwidth, and a network uplink speed for each backup operation of the backup operations;

determining a size of a dataset to be saved in each backup operation;

determining an available bandwidth in each transfer window of a plurality of transfer windows for transfer data between the source and destination;

determining an order of the backup operations based on first ordering the backups based on decreasing dataset size and second ordering the transfer windows in order of decreasing bandwidth; and matching the backups to the transfer windows in accordance with the first ordering and second ordering.

11. The method of claim 10 further comprising initiating a backup during a time window selected by the matching step.

12. The method of claim 11 wherein the backup comprises a plurality of stages comprising taking a snapshot copy of a respective dataset from a source, transferring the dataset to a specified destination, tiering of the dataset to cloud storage, or replicating the dataset to secondary storage.

13. The method of claim 12 further comprising initiating the backup after the snapshot copy taking step.

14. The method of claim 11 wherein the backup operations each implement a policy that specifies a plurality of service requirements and that is initiated at a time within the plurality of transfer windows.

15. The method of claim 14 further comprising:

determining, for each backup of the plurality of backups, a size of each dataset to be backed up by the respective backup;

monitoring a flow of data between the source and destination for the respective backup;

compiling historical data of operational parameters for data transfers between the source and destination for the plurality of backups; and determining an optimum time within the plurality of transfer windows based on the dataset size and the historical data for each backup of the plurality of backups.

16. The method of claim 15 wherein the historical data is used to establish bandwidth data used to derive the respective bandwidth capacities of each transfer window.

17. The method of claim 15 wherein the optimum time represents a time to initiate the backup operation that results in a shortest data transfer time over all of the transfer windows from as compared to other possible transfer windows in a defined backup period.

18. A computer-implemented method of optimizing backup operations for multiple datasets from a source to a destination in a data protection system, comprising:

determining a size of each dataset to be backed up by the backup operations;

monitoring a flow of data between the source and destination for each dataset;

compiling historical data of bandwidth capacity available within each transfer window of a plurality of time windows used by the backup operations;

iteratively ordering the backup operations within corresponding time windows based on respective dataset sizes and bandwidth capacities; and determining an optimum time within the plurality of time windows to initiate the backup operations based on an ordering that minimizes an overall backup time over all of the plurality of time windows.

19. The method of claim 18 further comprising:

first ordering the backups based on decreasing backup dataset size, with largest dataset ordered first;

second ordering the backups based on transfer windows based on decreasing bandwidth capacity, with highest bandwidth capacity first;

matching the largest dataset backup with the highest bandwidth capacity transfer window until at least one of: all of the plurality of backups are scheduled in at least one transfer window, or all transfer windows are occupied.

20. The method of claim 18 further comprising:

determining an order of the backup operations based on first ordering the backups based on decreasing dataset size and second ordering the transfer windows in order of decreasing bandwidth; and matching the backups to the transfer windows in accordance with the first ordering and second ordering.

* * * * *